United States Patent [19]

Kawauchi

[11] Patent Number: 5,276,083
[45] Date of Patent: Jan. 4, 1994

[54] CONTINUOUS POLYESTER FILAMENTS AVAILABLE FOR COMPOSING CARPETS

[75] Inventor: Mitsuru Kawauchi, Osaka, Japan

[73] Assignee: Kabushiki Kaisha Shinkasho, Osaka, Japan

[21] Appl. No.: 933,275

[22] Filed: Aug. 24, 1992

[30] Foreign Application Priority Data

Aug. 23, 1991 [JP] Japan .................. 3-295267
Aug. 23, 1991 [JP] Japan .................. 3-295268
Oct. 25, 1991 [JP] Japan .................. 3-343877
Oct. 25, 1991 [JP] Japan .................. 3-343878
Nov. 25, 1991 [JP] Japan .................. 3-355418

[51] Int. Cl.⁵ .................. C08L 67/03; C08G 63/183; D01D 5/22; B29C 47/88
[52] U.S. Cl. ...................... 524/539; 264/78; 264/168; 264/181; 264/184; 264/210.8; 264/211.17; 524/914; 525/439; 528/308.1; 528/308.2
[58] Field of Search .............. 524/539, 914; 525/439; 528/300, 308.1, 308.2; 264/78, 168, 181, 184, 210.8, 211.17

[56] References Cited

FOREIGN PATENT DOCUMENTS 0719191 10/1965 Canada .................. 264/78

Primary Examiner—Paul R. Michl
Assistant Examiner—Peter Szekely
Attorney, Agent, or Firm—Edwin E. Greigg; Ronald E. Greigg

[57] ABSTRACT

This invention is directed to continuous polyester filaments in tufted form for composing quality carpets having a pleasing appearance. The carpets are formed by use of continuous polyester filaments comprising polyethylene terephthalate resin having at least 85 mol % of ethylene terephthalate. The filament is completed by being placed in a curling stuffing box and applying a flow of heated air.

19 Claims, No Drawings

CONTINUOUS POLYESTER FILAMENTS AVAILABLE FOR COMPOSING CARPETS

BACKGROUND OF THE INVENTION

The present invention relates to continuous polyester filaments in tufted form available for composing quality carpets featuring incomparable uniformity of appearance.

Reflecting significant growth of synthetic filaments in these years, a variety of synthetic filaments have established overwhelming share in the composition of modern carpets by replacing traditional woolen carpets. From the viewpoint of physical and performance characteristics, these synthetic filaments are more suited for the composition of carpets than conventional woolen carpets, and yet, costwise advantage over wool accounts for the sharply increased share of those synthetic filaments in the production of carpet today. In particular, total output of polyester filaments has achieved an extremely high level, and yet, by virtue of decreased production cost and quite satisfactory hand, polyester filaments entertain vast potentials for the composition of carpets.

By virtue of similarity to wool, synthetic staple fibers have long been made available for the composition of carpets. Those carpets composed of these synthetic staple fibers make little difference from wool, thus providing much advantage.

On the other hand, from the viewpoint of productive efficiency, any of those conventional methods of manufacturing synthetic filaments available for composing carpets is by no means reasonable. Concretely, originally, synthetic fibers are produced in the state of continuous filaments, production of staple fibers results in costwise disadvantage because it compulsorily involves additional processes including cutting and spinning operations.

When manufacturing yarns from continuous synthetic filaments for the composition of carpets, manufacturers are obliged to provide those synthetic yarns with curling process. This is because a large amount of synthetic yarns are needed when producing a carpet by applying those synthetic yarns devoid of curled effect, and yet, because of insufficient bulkiness of tufted yarns, such a large amount of synthetic yarns are needed. Furthermore, those tufted yarns merely contain poor cushioning property and resiliency.

On the other hand, although the curling process for continuous synthetic filaments can be executed at inexpensive cost, those carpets composed of curled continuous synthetic filaments often generate specific defect that is rarely formed on those carpets composed of spun yarns. In particular, this defect is frequently generated in tufted carpets. Concretely, those domains containing varied luster and shades streakily appear in parallel with the running direction of needles.

On the other hand, by virtue of satisfactory mechanical property, durability, hand, and shade characteristic, and yet, owing to relatively low cost, polyester filaments and yarns are usefully made available for a wide variety of clothes and industrial goods.

Availing of distinctly satisfactory processability of polyester filaments and yarns, synthetic-fiber manufacturers have successfully improved quality of polyester filaments and yarns to be compatible with a wide variety of uses, thus gradually strengthening competitive potentials against all other synthetic fibers available today.

Polyester filaments proved to be quite satisfactory in quality for the composition of carpets. On the other hand, since polyester filaments contain such a specific gravity more than that of nylon or polypropylene or natural fiber like wool available for composing carpets, polyester filaments are slightly short of covering property when being made available for the superficial yarns of carpets.

To solve this problem, conventionally, the amount of superficial yarns is increased on condition that low-price polyester filaments are made available.

In order to provide sufficient covering property, manufacturers of polyester filaments available for composing carpets follow up improvement of covering property by deforming circular section of polyester filaments, method of contracting the process for deforming circular section of polyester filaments, and also a method of implementing these processes by achieving cost reduction. Not only for rationalizing production method, but the scope of cost reduction also involves saving of man-power and further decrease of the price of raw material. Nevertheless, actually, production of polyester fiber is underway at an accelerated operating efficiency, and yet, production of polyester fiber on a large package basis is also underway at a faster operating efficiency. In consequence, actually, further promotion of man-power saving can no longer yield substantial effect of cost reduction. Likewise, since the scope of the production of polyester fiber has fully been expanded today, even though the production scope may be expanded furthermore, it is quite difficult for all the concerned to sharply decrease the price of raw material below the present level. Furthermore, all the concerned can hardly orient the direction to follow up development of novel methods to achieve further cost reduction.

Recently, those plastic debris collected from scrap of molded products attract attention of the concerned. Relative to sharp growth of polyethylene terephthalate (PET) film and bottles in these years, a vast amount of plastic debris can potentially be procured for recycled use. Nevertheless, there are a wide variety of collectable plastic debris, and yet, quality of collectable plastic debris is noticeably variable. Therefore, unless selectively collecting a single kind of plastic debris, these collectable plastic debris cannot be made available for those objects subject to dyeing process. In particular, those plastic debris are not taken to be ideal for the raw material for composing filaments like bulky continuous filaments (BCF) containing curled property.

Even though collected debris of polyethylene terephthalate molded products may slightly incur transmutation of quality on the way of collection, owing to satisfactory fiber-forming property, it is not probable that production of filaments involves difficulty. On the other hand, conventionally, a variety of metamorphosing processes are applied to polyethylene terephthalate resin in order to improve film-forming property and molding property, and therefore, when transforming collected plastic debris into filaments, a variety of undesired properties are generated. For example, in order to facilitate molding operation, a substantial amount of diethylene glycol (GED) is copolymerized with resin available for executing a blow-molding process. Therefore, even when the blow-molded resin is transformed into filaments, the yeilded filaments incur yellowing symptom or sharply lowered lightfastness on exposure to light. In order to eliminate toxicity of aldehyde, it is imperative for such resin available for composing beverage/food bottles to minimize residual content of aldehyde. Therefore, it is preferred to use such resin containing a substantial amount terminal radical of carboxyl rather than the one containing a substantial amount of terminal radical of glycol that easily generates aldehyde. Nevertheless, after transforming collected resin into fibers, carboxylic terminal radical promotes thermal ageing effect.

On the other hand, since regenerated polyester resin is subject to re-melting process on the way of collecting process, the melted polyester resin is easily transmuted to result in the lowered limiting value of viscosity and the increased amount of carboxylic terminal radicals, thus eventually degrading own physical properties of the regenerated polyester resin.

In particular, the lowered limiting value of viscosity degrades tensile strength of fibers. When the regenerated polyester filaments are introduced for composing carpets incurring strong friction, carpet yarns quickly turn into fibrils during service. Once those fibrils are generated, dust easily deposits on the surface of the carpet to quickly stain the whole surface, and yet, these fibrils diminish depth of dyed shades to visually misgive users as though lightfastness is lowered.

It has long been pointed out that conventional carpets build more amount of static electricity in human bodies walking on the carpet than that is generated by other materials laid on floor. Since air-conditioning system has extensively been made available in modern life, the indoor environment tends to be short of moisture content, and thus, generation of static electricity is critical problem to solve. To properly solve this problem, a variety of useful methods have been introduced, for example, an art to coat the surface of component yarns with conductive resin and an art of blending conductive fibers with those component fibers composing a carpet, or the like. Although any of these useful methods proved to be quite effective, introduction of these methods raises the production cost of carpets, and yet, generally speaking, the effect of preventing static charge from occurence is not durable.

OBJECT OF THE INVENTION

Therefore, the invention has been achieved to fully solve those technical problems inherent in any conventional carpets. The primary object of the invention is to fully solve the above problems by compulsorily providing polyester filaments at inexpensive cost to facilitate carpet manufacturers when being obliged to use such polyester filaments containing less covering property in consideration of specific gravity for composing superficial yarns of carpets, and yet, solve quality-wise problem occurring from the use of these filaments.

Another object of the invention is to solve the above problem by enabling manufacturers to stably produce polyethylene terephthalate resinous filaments from regenerated resin collected from molded pieces of polyethylene terephthalate resin by securely generating satisfactory performance characteristic equivalent to or more than that of conventional polyethylene terephthalate resinous filaments when introducing the regenerated polyethylene terephthalate filaments to compose carpets. Another object of the invention is to solve another problem to minimize degradation of fiber properties in presence of a number of carboxylic terminal radicals and another problem to provide the regenerated polyethylene terephthalate filaments with useful properties to minimize generation of static charge therein.

In particular, another primary object of the invention is to reform regenerated polyethylene terephthalate resin containing lowered limiting value of viscosity and increased carboxylic radicals caused by execution of a remelting process by feeding selected additives during the remelting process so that physical properties of regenerated polyethylene terephthalate resinous filaments can be prevented from incurring degradation.

A still further object of the invention is to solve the problem inherent in any conventional carpet composed of conventional continuous filaments in terms of locally emerging streaky defect comprising varied luster and shade and also to solve another problem to securely prevent static electricity from occurring on the carpet otherwise being generated in human bodies walking on it.

SUMMARY OF THE INVENTION

To achieve those objects of the invention specified above, the invention provides novel continuous polyester filaments available for composing carpets, wherein each of the novel continuous polyester filament mainly comprises polyethylene terephthalate resin and is complete with provision of curled effect generated in a stuffing box, wherein density of each curl ranges from 3 to 15 pieces per 25 mm, and wherein each of those novel continuous polyester filaments is provided with sufficient bulkiness.

Structurally, the novel polyethylene terephthalate resin embodied by the invention at least contains 85 mol % of ethylene terephthalate unit. The curling method via the stuffing box comprises two ways including the one making use of hot-air flow and the other one availing of a nip roller. Either of these curling methods is suited for embodying the invention. However, the former method availing of hot-air flow is better suited for embodying the invention because of workability at a faster operating speed. In order to securely maintain low cost, it is most ideal for the invented system to provide the curling effect for continuous filaments after continuously executing an elongation process and an elongation process. Such a false twisting method is not recommended for use because this method is not appropriate for processing thick filaments/yarns at a fast operating speed.

If the processed filaments were provided with such curls being less than three pieces per 25 mm, then sufficient bulkiness cannot be yielded, and yet, since tufted yarns are apt to fall down themselves after being composed into a carpet, use of these defective filaments is not recommended to implement the invention. Conversely, if there were more than 15 pieces of curls per 25 mm, then, tufted yarns are softened to merely generate infirm structure of the carpet, and yet, since the force to tangle with adjoining filaments intensifies, stain easily adheres onto the carpet surface, and therefore, use of these defective filaments is not recommended to implement the invention.

Desirably, the invention defines that at least 20% by weight of raw material be shared by the regenerated polyethylene terephthalate resin against total amount of available raw material. If less than 20% by weight of the regenerated polyethylene terephthalate resin were present against total amount of available raw material, then, the low cost of raw material cannot ideally be reflected in the production cost. Therefore, less than 20% by weight of the share of the regenerated polyethylene terephthalate resin is not appropriate for use. Desirably, the regenerated polyethylene terephthalate resin is remelted and then formed in pellets. Each pellet contains all granules supposed to be delivered to a spinning machine. Not only those granules formed in a predetermined shape suited for the extrusion molding process, but each pellet also contains cut or broken pieces of molded products as well.

When implementing the invention, desirably, the content ratio of carboxylic radical in all the terminal radicals present in polyethylene terephthalate resin ranges from 30% to a maximum of 85%. The content of carboxylic radical against all the terminal radicals is determined by estimation of carboxylic radical, measurement and averaged quantitative molecular amount of by estimation of carboxylic radical and hydroxyl. Desirably, the continuous polyester filaments embodied by the invention shall contain 30 through 70 microequivalent/gram of carboxylic radical.

If there were merely less than 30% of the content of carboxylic radical against all the terminal radicals, then, a substantial amount of static electricity will be charged in human bodies walking on the carpet, and therefore, application of less than 30% of the content should be prohibited. Immediately after completing production of a carpet, static chsrge is irrelevant to the content of carboxylic radical. However, substantial difference of the chargeable static effect distinctly appears after several weeks are past. Although it is not yet certain why the static electricity is not chargeable against human bodies when the carpet yarns contain more than 30% by weight of carboxylic radical, it is likely that the high content of carboxylic radical effectively absorbs external conductive material to result in the strengthened superficial conductivity of the carpet. Nevertheless, if there were more than 85% by weight of the content of carboxylic radical in those carpet yarns, then, carboxylic terminal radical will adversely accelerate degradation of polyester resin. Therefore, application of the excessive content of carboxylic radical should also be prohibited.

When implementing the invention, desirably, the regenerated polyester resin sharing part of the raw material for composing continuous filaments of carpets shall be dried in atmosphere containing below $-20°$ C. of dew-point temperature, and yet, the limiting value of viscosity after execution of a remelting process shall be higher by 0.01 through 0.15 than that is rated before execution of the above drying process. Desirably, the regenerated polyester resin shall be dried in atmosphere containing 130° C. through 190° C. of heat. The limiting value of viscosity available for implementing the invention is rated at 30° C. by applying blend solvent containing equivalent amounts of phenol and tetrachloroethane.

When implementing the invention, desirably, 0.2 through 15 mol % of dibasic acid contained in the regenerated polyethylene terephthalate resin shall be the content of carbonic acid. If carbonic acid merely shares less than 0.2 mol % in dibasic acid, then, it makes no difference from conventional polyethylene terephthalate resin in terms of physical and performance characteristics. As a result of a remelting process, the regenerated polyester resin is significantly degraded, and yet, effect of carbonic ester added as viscosity intensifier cannot fully be exerted. Therefore, application of less than 0.2 mol % of carbonic acid in dibasic acid should be avoided. Conversely, if more than 15 mol % of carbonic acid shares in dibasic acid contained in the regenetated polyester resin, then, softening point of the regenerated polyester resin extremely lowers to significantly lower the thermal-curing property of the regenerated polyester resin. This in turn makes it quite difficult for the production system to properly provide curling effect for the eventual continuous filaments in a stuffing box. Therefore, application of more than 15 mol % of carbonic acid in dibasic acid should also be prohibited. On the other hand, when introducing novel polyethylene terephthalate resin copolymerized with carbonic acid according to an embodiment of the invention, even though the resin contains a large amount of carboxylic terminal radicals, the resin itself merely incurs minimal degradation as an advantageous feature.

When implementing the invention, desirably, the novel polyester resin available for composing continuous bulky filaments of carpet is thermally regenerated by a melting process with carbonic ester added thereto, where the limiting value of viscosity after completing the melting process is higher by by 0.01 through 0.25 than that is rated before execution of the drying process. After completing the melting process, if there were merely less than 0.01 of the increased limiting value of viscosity, then, reforming effect cannot fully be achieved, and therefore, application of this short viscosity limiting value should be prohibited as well. Conversely, if there were more than 0.25 of the increased limiting value of viscosity, then, copolymerization between carbonic acid and polyethylene terephthalate is promoted to lower crystalline property and melting point of the regenerated polyester resin, thus significantly degrading thermal resistivity and thermal curing property of the regenerated polyester resin to such a degree inappropriate for the composition of carpets, and thus, increase of the limiting value of viscosity by more than 0.25 should also be prohibited.

Specifically, low-grade alcoholic carbonic ester and phenolic carbonic ester shall be added to the regeneted polyester resin before executing the remelting process for embodying the invention. Addable carbonic ester also includes polyhydric alcohol higher than dihydric alcohol or polyhydric phenol higher than dihydric phenol. More particularly, the embodiment of the invention permits manufacturers to use those low-grade alcoholic carbonic esters including diethyl carbonate, dibutyl carbonate, ethylene carbonate, and propylene carbonate, or the like, and phenolic carbonic ester like diphenyl carbonate for example.

Desirably, the novel polyester filaments embodied by the invention comprises more than two kinds of continuous filaments. Blend of more than two kinds of continuous filaments usefully minimizes streaky defect that frequently occurs on the way of composing a tufted carpet.

When composing more than two kinds of continuous filaments, desirably, each kind of continuous filaments shall have own length different from each other, own blend ratio of regenerated polyester resin different from each other, own content of carboxyl terminal radical of regenetated polyester resin being different from each other, own content of flexible chain of regenerated polyester resin being different from each other, and yet, each kind of these novel continuous filaments shall be complete with dyeing process using more than two colors.

Fundamentally, each bundle of more than two kinds of continuous filaments having different own length shall have 1 through a maximum of 25% of lengthwise difference. If there were merely less than 1% of lengthwise difference between each kind of those continuous filaments, then streaky defect cannot fully be prevented from occurrence. Conversely, if there were more than 25% of difference between each kind of those continuous filaments, then, the short-length continuous filaments cannot evenly be dyed. Therefore, neither of these lengthwise difference is recommended for use. Desirable aspect of the method of manufacturing novel continuous filaments having lengthwise difference includes the following: Initially, an elongation process is executed in succession to a process for spinning melted resin into filaments. Next, a process for blending regenerated continuous filaments is executed in order to coordinate variable range of shrinkage of processed filaments via boiled water to be from 0.8 to a maximum of 20%. Next, the blended filaments are delivered to the internal chamber of a stuffing box by means of heated air flow before eventually curling the heated filaments.

In order to blend different kinds of continuous filaments, a variety of practical methods are available including the following; a method of spinning different kinds of resin out of different spinning apertures of an identical spinning mouth piece; a method of spinning different kinds of resin out of a plurality of spinning mouth pieces before eventually elongating the spun resinous filaments in succession to a process for aligning these filaments via a cooling or lubricating process; and a method of properly aligning resinous filaments of identical kind or different kinds spun out of a plurality of spinning apertures on the way of or after completing the elongation process. Substantially, 0.8 through a maximum of 20% of the difference in the shrinkage rate of resinous filaments via boiled water after completing the elongation process corresponds to 1 through a maximum of 25% of the lengthwise difference between these filaments after being subject to the curling process. Either pressurized air or heated steam may effectively be applied to the process for curling those resinous filaments. However, in consideration of substantial thermal conductivity and heating speed, heated steam is better suited for implementing the curling process with fast speed. When composing those resinous filaments by way of providing them with lengthwise diffrence, desirably, those resinous filaments in the combined formation shall contain a minimum of 0.02 of the limiting value of viscosity, a minimum of 2° C. of the difference in the melting point, and yet, those resinous filaments shall also contain varied magnification of elongation, and varied temperature in the course of the thermal treatment.

In order to measure the lengthwise difference between those resinous filaments in the combined formation, lengthy samples should be prepared before measuring the actual length of these filaments by dividing them into monofilaments. Next, except for the maximum and minimum values, those values corresponding to the upper and lower 10% of the measured length are averaged. Next, the lower mean value is designated in terms of percentage against 100 of the upper mean value before eventually determining the difference between the upper and lower mean values to be the actual difference of the length between the sampled resinous filaments. Desirably, each resinous filament sample shall have 30 through 50 cm of length. Nevertheless, since those novel continuous filaments available for composing carpets are interlaced in most cases, lengthy samples can hardly be procured. To compensate for this, a certain degree of tension is applied to those filament samples having a minimum of 50 cm of length so that majority of the curled filament samples can fully be elongagted, and then, those filament samples including a knot of interlaced filaments are respectively cut off to enable the tester to correctly measure the actual length of resinous filaments.

When interlacing those resinous filaments in order to generate lengthwise difference, among those filaments containing limiting values of viscosity being different from each other by more than 0.02, desirably, the filament component containing the lowest limiting value of viscosity shall be rated to be lower by 1 through a maximum of 35% in the difference of the limiting value of viscosity against the filament component containing the highest limiting value of viscosity. If there were merely a negligible difference in the limiting value of viscosity, then, substantial lengthwise difference cannot be generated. Conversely, if there were excessive difference in the limiting value of viscosity, then, some domains of the filaments may not properly be elongagted on the way of the elongation process. The difference in the limiting value of viscosity corresponding to 2.5 through 17.5% of the limiting value of viscosity of the filament component containing the highest limiting value of viscosity is most ideal.

Those polyester filaments containing different melting points by more than 2° C. respectively generate lengthwise difference. Presumably, this is because those polyester filaments made from identical polymer containing low melting point also contain low modulus of elasticity. When being elongated in alignment with those filaments containing high melting point, in particular, when being freed from tension, those filaments containing low melting point are subject to substantial shrinkage, thus generating a slight difference in length. On the other hand, those filaments containing low melting point sharply shrink themselves in a stuffing box. Therefore, by effectively combining both effects mentioned above, lengthwise difference can be offset to such a degree where streaky defect is no longer discernible.

As a whole, those filaments containing low melting point quickly absorbs dyestuff, and therefore, these filaments are likely to be dyed with heavy-depth shades. Owing to lengthwise difference of those polyester filaments available for composing carpets related to the invention, those filaments containing low melting point can easily be inserted between each filament bundle. If those filaments dyed in heavy shade were densely present in the interior of each filament bundle, then uneven shade of dyed filaments cannot easily be discerned, thus effectively masking superficial stain. On the other hand, presence of those filaments containing low melting point in each filament bundle lowers dyeing efficiency of dyestuff, thus resulting in the increased dyeing cost. Therefore, taking these conditions into account, difference of melting point in a range from 5% to a maximum of 20% is most ideal.

According to another aspect of the embodiment of the invention, desirably, available polyester filaments should generate 5% through a maximum of 25% of lengthwise difference between component monofilaments by executing a thermal treatment at 100° C. through 170° C. By virtue of the lengthwise difference provided for those available polyester filaments, those continuous polyester filaments embodied by the invention are fully provided with bulky appearance like spun yarns, thus generating sophisticated appearance. Furthermore, streaky defect, uneven luster, and uneven shade generated in dyed polyester filaments can also be masked to full extent.

According to a still further aspect of the embodiment of the invention, regenerated polyethylene terephthalate resin is effectively made available for producing carpet yarns comprising more than two kinds of continuous filaments, and yet, blend ratio of the regenerated resin is variable. By varying the blend ratio of the regenerated resin, optimal difference can be generated in the limiting value of viscosity, melting point, and the content of carboxylic terminal radical. Blending of regenerated resin is applicable to the production all the available continuous filaments or part of them. In the light of extremely satisfactory spinning property of polyester filaments, even though these are made from regenerated resin, the spun-out polyester filaments cannot easily be cut off. On the other hand, since the regenerated resin is subject to a re-melting process, pyrolysis is promoted In order to prevent the genuine quality of regenerated resin from incurring degradation, all the prepared pellets should be subject to preliminary thermal treatment and contain properly selected additive.

Desirably, continuous filaments available for composing carpets according to the invention comprise more than two kinds of continuous polyester filaments. Characteristically, against all the carboxylic terminal radicals present in the novel polyester filaments embodied by the invention, the content of polyester component containing the largest amount of carboxylic terminal radical is in a range from 30% to a maximum of 85%. Characteristically, the difference between the maximum and minimum contents of carboxylic terminal radical against all the terminal radicals present in polyester filaments available for composing carpets ranges from 0.5% to a maximum of 20%.

If there were merely less than 30% of the content of the polyester filament component containing the largest amount of carboxylic terminal radical against all the terminal radicals, then, it raises critical problem in carpets caused by generated static electricity. Even though there is a certain difference in the content of carboxylic terminal radical in the polyester filaments, streaky defect cannot be minimized, and therefore, less than 30% of the above content is not appropriate for use.

On the other hand, if there were merely less than 0.5% of the difference between the maximum and minimum contents of carboxylic terminal radical, like the above case, streaky defect cannot be minimized, and therefore, provision of 0.5% of the above difference is also inappropriate for use. Conversely, if there were more than 25% of the difference between the maximum and minimum contents of carboxylic terminal radical, since the polyester filament component containing the largest amount of carboxylic terminal radical has poor lightfastness, time-aged variation of the appearance of carpet is accelerated, and therefore, the above-cited 25% of difference is also inappropriate for use. Desirably, the difference between the maximum and minimum contents of carboxylic terminal radical should range between 2% and a maximum of 15%.

Streaky defect is minimized only when ideal difference is provided between the maximum and minimum contents of carboxylic terminal radical. Although this reason is not yet certain, it is likely that the decrease of streaky defect is caused by presence of a certain difference in the adhesive property of particles containing charge. It is also presumed that, since there is a certain difference in the speed of forming conductive layer on the fibrous surface by way of externally absorbing charged particles, while curling process is underway in a stuffing box against continuous polyester filaments with flow of hot air, particles of aerosoled oil agent or water cincentrically adhere to part of filament component to generate unevenness for a short period of time, and therefore, long-periodic unevenness is indiscernible. Ionic carboxylix terminal radicals are unstable inside of polyester filaments, and yet, apt to gather themselves on the surface of polyester filaments. As a result, stable charge is deposited on the surface of polyester filaments containing a substantial amount of carboxylic terminal radicals, and as a result, streaky defect is minimized where there is a certain difference between the maximum and minimum contents of carboxylic terminal radicals in polyester filaments.

The invention further features another aspect of the embodiment by providing those novel blend filaments dyed in more than two shades.

Desirably, those continuous polyester filaments dyed in a variety of shades available for composing carpets related to the invention substantially comprise those polyester filaments dyed by means of an identical dyestuff in a variety of depth, or those polyester filaments containing different blend ratio of regenerated resin, or those polyester filaments containing varied limiting value of viscosity, or those polyester filaments each containing different melting point by more than 2° C., or the combination of those polyester filaments cited above.

It is also desired that the filament component containing a substantial amount of carboxylic terminal radical shall contain substantial concentration of dyestuff or pigment, or high blend ratio of regenerated resin, or low limiting value of viscosity, or low melting point.

Next, a concrete method of manufacturing continuous polyester filaments available for composing carpets as another aspect of the embodiment of the invention is described below. Initially, those polyester resinous materials impregnated with selected dyestuff or pigment are blended with those polyester resinous materials containing different amounts of carboxylic radical per shade before eventually preparing melted polyester resinous materials dyed in different shades. Next, the melted polyester resinous materials are spun into continuous filaments via a spinning process before being elongated. Next, those elongated continuous filaments are properly processed in order that 0.5% through a maximum of 2.5% of difference can be generated between the maximum and minimum contents of carboxylic terminal radical against all the terminal radicals present in those continuous polyester filaments. Finally, the processed continuous polyester filaments are delivered to the internal chamber of a stuffing box by means of heated air before eventually being subject to a curling and shrinking process.

Characteristically, the invention provides novel continuous polyester filaments comprising more than two kinds of polyester filaments, where the difference between the maximum and minimum contents of flexible chains of polyester resin composing those continuous polyester filaments ranges from 0.1% to a maximum of 4%, and yet, these continuous polyester filaments are individually curled and shrunk via a thermal treatment executed in a stuffing box.

The term "flexible chains" cited in the embodiment of the invention designates such a single bond domain where rotation is not constrained by cyclic structure of conjugate system in polymer chains. The content of flexible chains is expressed by way of designating molecular weight of the domains linked by means of flexible chains in the percentage against total molecular weight. If there were merely less than 0.1% of the difference between the maximum and minimum contents of flexible chains, then, streaky defect containing varied luster and shades often appears, and thus, provision of less than 0.1% of the difference cited above should be prohibited. Likewise, if there were more than 4% of the difference between the maximum and minimum contents of flexible chains, then, durability of produced carpet will significantly be lowered because those polyester filaments containing a substantial amount of flexible chains are short of thermal resistivity and poor in the lightfastness.

When implementing the invention, desirably, the above-cited flexible chians shall be derived from one kind or more than two kinds of compound selected from a group of diethylene glycol, polyethylene glycol, fatty-acid dicarboxylic acid, and fatty-acid oxycarbolic acid. Functionally, flexible chains promote softness of polymer and vary frictional characteristic. Because of this, it is presumed that the streaky defect is effectively minimized by virtue of the improved reproducibility of buckling stress of polyester filaments on the way of executing a curling process in a stuffing box.

Of those polyester filaments available for composing more than two kinds of carpet yarns, desirably, the limiting value of viscosity of polyester filaments containing maximum amount of flexible chains shall be greater by 0.01 through 0.20 than that of those polyester filaments containing minimum amount of flexible chains. The difference of the limiting value of viscosity makes up one of those factors generating difference of length between the component polyester filaments, and therefore, this difference is quite effective for those polyester filaments available for composing carpets with minimum streaky defect.

Desirably, the continuous polyester filaments embodied by the invention shall contain 0.01 through 2% by weight of a single kind or more than one kind of specific additive selected from a group of antioxidant and/or ultraviolet absorber. In order to improve molding characteristic, conventional polyethylene terephthalate resin contains a large amount of specific component which is not present in polyester filaments. Since it involves much difficulty to fully eliminate this component from the regenetated polyethylene terephthalate resin, it is desired that performance characteristic of the regenerated resinous pellets can effectively be prevented from being lowered by presence of this unwanted component by adding properly selected antioxidant and/or ultraviolet absorber to them.

Concretely, it is suggested that any of those antioxidants may be added to the regenerated polyethylene terephthalate resinous pellets, for example, including the following; hindered phenolic compound like tocopherol, 3,5-dibutylhydroxy toluene, 2,4,6-tri-t-butyl phenol, or 3,5-di-t-butyl-4-hydroxybenzyl phosphoric-acid diethyl ester, or the like, or such phosphite like triphenyl phosphite. Care should be taken not to add aromatic amines being effective to prevent rubber from incurring oxidation because aromatic amines easily react with polyester resin to generate colored material.

Any of those ultraviolet absorbers capable of absorbing 280 through 310 micrometers of wavelength may be added to the regenerated polyester resinous material. Of these, it is desired that triple-effect light-extinguishing agent like benzo-phenon or benzo-triazol be introduced.

There are a number of additives containing any of those sensory radicals such as phenolic hydroxyl, alcoholic hydroxyl, carboxylic radical, and amino radical, for example. However, when implementing the invention by way of blending paste-form additive with melted pellets on the way of executing the process for melting and spinning these pellets, desirably, the applied additive should be free of sensory radical or prevented from incurring reaction by virtue of the ortho-effect, or the applied additive should properly retain own function even after being reacted with polyester resin. Instead of blending paste-form additive with melted polyester resin, selected additive may also be distributed inside of polyester filaments by applying any of those conventional methods available for dyeing process executed against spun filaments.

By virtue of quite satisfactory hand and durability, those continuous filaments made from polyethylene terephthalate are effectively made available for composing carpets. On the other hand, since those polyester filaments inherently contain substantial specific gravity, covering force per weight is not sufficiently available. In consequence, compared to other kinds of fibers, polyester filaments incur costwise disadvantage.

Nevertheless, the invention has successfully solved the above disadvantages by providing novel continuous polyester filaments made from polyethylene terephthalate resin. Nevertheless, when being melted, polyethylene terephthalate resin is not fully stable in thermal environment, and therefore, after execution of a molding process, polyethylene terephthalate resin is significantly transmuted, and yet, it incurs more distinct transmutation after being subject to ensuing molding process. Although no substantial difference is generated in the strength and the modulus of elasticity, as a whole, those filaments made from polyethylene terephthalate resin proved to be lower in the extensibility, durability, and lightfastness than those filaments made from fresh polyethylene terephthalate resin.

Presumably, transmutation of polyethylene terephthalate resin is mainly caused by easily occurring oxidation of ether union of diethylene glycol copolymerized in the state of impurities and by the accelerated hydrolysis caused by carboxylic terminal radicals. Unlike conventional highpolymers, when polyethylene terephthalate resin is forcibly dehydrated under a specific condition, inherent molecular weight significantly varies, thus causing molecular terminal radicals to also vary themselves. In particular, when polyethylene terephthalate resin slightly incurs pyrolysis, own molecular weight significantly increases to facilitate improvement of extensibility and durability.

When dissolving polyethylene terephthalate resin by adding such compound of carbonic ester thereto after materializing substantial pyrolysis of this resin, the balance between carboxylic radical and hydroxyl in the reaction system varies itself by way of promoting reaction so that molecular weight can be increased. Simultaneously, a certain material containing low-boil point is generated. When externally discharging this material, molecular weight increases so that performance characteristic of filaments made from polyethylene terephthalate resin can be improved. Copolymer of carbonic ester is quite stable on exposure to light and in presence of antioxidant, thus effectively promoting durability and light-fastness of those filaments made from polyethylene terephthalate.

Substantially, polyethylene terephthalate is crystalline and chemically inert in the neighborhood of room temperature. Nevertheless, molecular terminals contain very active radicals. This in turn delicately varies physical property of polymer. In particular, it appears that superficial physical property is significantly variable. Generally, polyethylene terephthalate made from regenerated resin is apt to contain a number of carboxylic terminal radicals. Carboxylic terminal radical adversely lowers thermal stability of polyethylene terephthalate resin, but on the other hand, carboxylic terminal radical generates conductive layer on the surface of polyester filaments. Presumably, presence of the conductive layer on the surface of polyester filaments minimizes static charge on the carpet.

It is also probable that frequent occurrence of streaky defect on the carpet composed of continuous tufted yarns is caused by significantly uneven property of those continuous tufted yarns from a long-term viewpoint irrelevant to their distinct uniformity noticed from a short-term viewpoint. It is also probable that provision of lengthwise difference between respective monofilaments composing continuous polyester filaments generates uneveness of tufted carpet yarns based on a short-term viewpoint. Nevertheless, it is also probable that presence of the unevenness indiscernibly masks long-term unevenness of carpet yarns themselves.

It is not yet certain why streaky defect is minimized when a certain difference is present in the contents of carboxylic terminal radical. However, probably, this is caused by presence of difference in the adhesion of those particles containing charge.

Immediately after completing the production of carpets embodied by the invention, there is no significant difference in the magnitude of static charge between those continuous polyester filaments related to the invention and those conventional carpet yarns. Nevertheless, soon after laying the carpet embodied by the invention on a floor, it proved to be extremely resistant to the generation of static charge. It appears to be probable that those novel continuous polyester filaments in the carpet externally absorb charged particles before eventually forming a conductive layer on the surface of the carpet.

Likewise, similar phenomenon also takes place on the way of executing a curling process against elongated continuous polyester filaments in a stuffing box with flow of hot air. In this case, aerosoled oily or aqueous fine particles concentrically adhere to part of filament components to result in the formation of short-periodic uneven effect. Presumably, this phenomenon indiscernibly masks long-periodic unevenness of the composition of the carpet. Physically, ionic carboxylic terminal radicals remain unstable inside of polyester resin, where these radicals are apt to gather themselves on the fibrous surface. Therefore, it appears probable that this phenomenon is caused by presence of stable charge on the surface of polyester resin containing a substantial amount of carboxylic terminal radicals.

Those flexible chains present in the novel polyester resin composing continuous filaments available for composing novel carpets embodied by the invention can stably reform modulus of elasticity and frictional characteristic of polyester filaments. It is presumable that those characteristics differently being present in those continuous filaments of each filament bundle help promote readiness to open intervals between component filaments, and yet promote reproducibility of buckling stress of component filaments on the way of executing a curling process in a stuffing box, thus eventually resulting in the minimized streaky defect of those novel continuous polyester filaments in the carpet.

DETAILED DESCRIPTION OF THE PREFERRED EMBODIMENTS

Referring now to the following embodiments, full aspects of the invention are described below.

The 1st Embodiment

Initially, inventors dried those blending materials including the following in an atmosphere containing $-55°$ C. of dew-point temperature; 30 parts of polyethylene terephthalate pellet collected from debris of molded film, where the PET pellet contained 0.54 of the limiting value of viscosity and 65 micro-equivalent/gram of carboxylic terminal radical; 50 parts of polyethylene terephthalate pellet collected from scrapped bottles, where the PET pellet contained 0.52 of the limiting value of viscosity and 82 micro-equivalent/gram of carboxylic terminal radical; and 20 parts of polymerized pellets, where these pellets contained 0.65 of the limiting value of viscosity and 26 micro-equivalent/gram of carboxylic terminal radical.

Inventors executed the above drying process at 178° C. for 360 consecutive minutes by applying such an air-flow amount (weight) 2.5 times the amount of melted pellet. Before executing the above drying process, prepared pellet contained 0.57 of the averaged limiting value of viscosity and 67 micro-equivalent/gram of the averaged amount of carboxylic terminal radical.

Next, inventors dissolved those collected PET pellets before executing an extrusion process. Then, inventors continuously executed a spinning process and an elongation process for the dissolved PET pellet, and then, executed a curling and shrinking process for the elongated filaments via a conventional method. Finally, inventors yielded bulky continuous filaments each containing 4000 denier per 280 filament unit. The yielded continuous filaments respectively contained 0.60 of the limiting value of viscosity and 36% of carboxylic terminal radical against all the terminal radicals present in the yielded continuous filaments.

The yielded continuous filaments proved to be quite satisfactory in the strength and extensibility for application to carpets embodied by the invention. These novel continuous filaments also proved to be comparable to conventional polyethylene terephthalate filaments in the shade, whiteness, dyeability, and level-dyeing property. These novel continuous filaments also yielded satisfactory dyeing fastness properties equivalent to those of conventional continuous filaments after completing dyeing processes with a number of dyestuffs. However, dyed fastness was rated to be slightly lower by 0.5 to 1.0 of rating after being dyed with some dyestuffs. Nevertheless, these ratings are satisfactorily acceptable for any conventional carpet.

The 2nd Embodiment

Using those polyethylene terephthalate pellets recycled from molded products with a variety of blend ratios and applying drying air and amount of air-flow identical to those which are made available for implementing the first embodiment, inventors dried the dissolved PET pellets by way of varying temperature and timewise condition, and finally measured the limiting value of viscosity after completing extrusion of dissolved PET resin, and then measured the content of carboxylic terminal radicals present in the dissolved PET resin. The result is shown in Table 1.

The 1st Comparative Embodiment

Initially, inventors collected polyethylene terephthalate pellets from scrapped bottles, where those collected PET pellets contained 0.52 of the limiting value of viscosity, 48 micro-equivalent/gram of carboxylic terminal radical, and 3.2 mol % of diethylene glycol. Next, inventors dried those collected PET pellets at 140° C. for 25 minutes in presence of −15° C. of atmospheric dew-point temperature. Next, inventors dissolved those PET pellets, extruded, and spun the extruded PET resin into filaments. Next, inventors elongated and curled those spun-out filaments before eventually yielding those bulky continuous filaments each containing 3600 denier per 280 filament unit. Those spun-out filaments contained 0.51 of the limiting value of viscosity and 16% of carboxylic terminal radical against all the terminal radicals present in the yielded filaments. The yielded continuous filaments proved to have contained sufficient strength and extensibility acceptable for composing a carpet, and yet, these yielded continuous filaments proved to be comparable to conventional PET filaments in the shade and whiteness. In addition, these yielded continuous filaments proved to be better in the dyeability at low temperature than that of the conventional PET filaments. On the other hand, these yielded continuous filaments were rated to be lower by 0.5 to 1.0 of rating in the lightfastness after completing dyeing processes with a number of dyestuffs, and yet, the lightfastness was also rated to be lower by 2.0 of rating after completing dyeing processes with some dyestuffs. After checking the wear-resistance, inventors evaluated that these continuous filaments were apt to easily turn into fibrils. In consequence, as a whole, inventors evaluated these continuous filaments yielded from the second embodiment to be inappropriate for composing carpets from the viewpoint of those physical characteristics described above.

The 3rd Embodiment

Initially, inventors dried those blending materials including the following in such an atmosphere containing −46° C. of dew-point temperature; 65 parts of polyethylene terephthalate pellet collected from debris of molded film, where the PET pellet contained 0.54 of the limiting value of viscosity, 39 micro-equivalent/gram of carboxylic terminal radical; and 22% of carboxylic terminal radical against all the terminal radicals; and 35 parts of polyethylene terephthalate pellet collected from scrapped bottoles, where the collected PET pellet contained 0.52 of the limiting value of viscosity, 61 micro-equivalent/gram of carboxylic terminal radical, and 32% of carboxylic terminal radical against all the terminal radicals. Inventors executed the above drying process at 173° C. for 360 consecutive minutes by varying the flow rate of hot air, and then extruded dissolved polyethylene terephthalate resin. Next, inventors spun the extruded resin into filaments, and then executed an elongation process and a curling process before eventually yielding bulky continuous filaments containing 3600 denier per 280 filament unit. Table 2 designates the limiting value of viscosity and the content of carboxylic terminal radical measured in the yielded continuous filaments.

Inventors detected from the 16th and 17th samples that fine particles present in the regenerated polyethylene terephthalate pellet were blown off by air and heavily deposited themselves on such a domain where flow rate remained low, and therefore, inventors evaluated that these samples could not durably stand the above drying process for a long while.

The 4th Embodiment

Initially, inventors prepared regenerated chips of polyethylene terephthalate resin by securing those conditions including the following; 0.57 of the limiting value of viscosity, 52 micro-equivalent/gram of the averaged content of carboxylic terminal radical, 32% of carboxylic terminal radical against all the terminal radicals, and 2.3 mol % of the averaged content of giethylene glycol. Next, invaentors added selected additive to the prepared chip, where the additive includes the following; 0.05% by weight of hindered phenolic antioxidant ("Tetraquis" (methylene-3-(3'5-di-t-butyl 4'- hydroxyl phenol) propyonate methane) and 0.07% by weight of ultraviolet absorber comprising 0,0'-dioxybenzophenon. Next, in accordance with those conditions made available for the first embodiment, inveantors dried the regenerated resin, and them dissolved and extruded it. Inventors then spun the extruded resinous material into filaments, and finally yielded bulky continuous filaments containing 3580 denier per 280 filament unit by executing a conventional method.

Inventors analyzed that the yielded continuous filaments contained 2.3 mol % of diethylene glycol, 34% of carboxylic terminal radical against all the terminal radicals, and 0.59 of the limiting value of viscosity. Compared to those conventional continuous filaments devoid of antioxidant and ultraviolet absorber, those continuous filaments yielded by execution of the above processes according to the fourth embodiment proved to be 1 rating higher in the lightfastness after being dyed with a number of dyestuffs, and yet, satisfactory in the thermal ageing property.

The 5th Embodiment

Initially, inventors dried those blending materials including the following; 32 parts of polyethylene terephthalate pellet collected from debris of molded film, where the collected pellet contained 0.54 of the limiting value of viscosity and 52 micro-equivalent/gram of carboxylic terminal radical; 48 parts of polyethylene terephthalate pellet collected from scappred bottles, where the collected pellet contained 0.52 of the limiting value of viscosity and 70 micro-equivalent/gram of carboxylic terminal radical; and 20 parts of polymerized peelt containing 0.65 of the limiting value of viscosity and 21 micro-equivalent/gram of carboxylic terminal radical. Next, inventors uniformly blended those pellet samples with 2 parts of diphenyl carbonate, and then dissolved the blended material by applyying a screw extruder furnished with a ventilation hole at a location corresponding to 18D (where D designates inner diameter of cylinder) below a hopper. On the way of executing this dissolving process, melted material was absorbed through the ventilation hole, and then depressurized by such an amount corresponding to 70mmHg by applying absolute pressure.

Before executing the above drying process, the collected pellets contained 0.55 of the limiting value of viscosity and 54 micro-equivalent/gram of carboxylic terminal radical in average, respectively. Next, using the dissolved solution of the collected pellet, inventors spun the extruded material into filaments by applying the conventional method, and then elongated the spun-out filaments before thermally curling them to complete production of bulky continuous filaments containing 3975 denier per 272 filament unit. Those produced bulky continuous filaments contained 0.63 of the limiting value of viscosity, 0.5 mol % of the blend ratio of copolymerized carbonate ester, and 32 micro-equivalent/gra, of carboxylic terminal radical.

Inventors evaluated the strength and extensibility of these yielded bulky continuous filaments to be fully satisfactory for the composition of novel carpets, and yet, to be comparable to those conventional polyethylene terephthalate filaments in terms of dyed shade, whiteness, resistance against yellowing effect, durability, and level-dyeing property. In addition, those yielded novel continuous filaments proved to be equivalent to those conventional PET filaments in the lightfastness property after being dyed with a number of dyestuffs except for the lower lightfastness by 0.5 of rating after being dyed with some dyestuffs. Nevertheless, inventors evaluated that the above-cited result could satisfactorily be accepted when applying those novel continuous filaments to the composition of conventional carpets.

The 2nd Comparative Embodiment

Initially, inventors dried regenerated polyethylene terephthlate pellet collected from scappped botdes at 140° C. for 25 minutes in such an atmosphere containing −15° C. of dewpoint temperature conventionally being made available, where the collected PET pellets contained 0.52 of the limiting value of viscosity, 48 micro-equivalent/gram of carboxylic terminal radical, and 3.2 mol % of diethylene glycol, respectively. Next, using an extrusion molding unit, inventors dissolved the dried PET pellets, and then spun the melted material into filaments by applying a conventional method. Next, inventors elongated and curled those spun-out filaments before eventually yielding bulky continuous filaments containing 3900 denier per 272 filament unit. After being spun into filaments, the novel regenerated PET filaments contained 0.52 of the limiting value of viscosity and 55 micro-equivalent/gram of carboxylic terminal radical.

Inventors evaluated those bulky continuous filaments yielded by executing the processes established for the fifth embodiment to be acceptable for the composition of novel carpets in terms of the strength and extensibility, and yet, to be comparable to those conventional PET filaments in the dyed shade and whiteness. Furthermore, inventors confirmed that those novel continuous filaments according to the fifth embodiment of the invention were properly dyed in a normal pressure dyeing machine with some dyestuffs, thus proving to be satisfactory in the dyeability at low temperature. Nevertheless, inventors evaluated those yielded bulky continuous filaments to be slightly low in the lightfastness by 0.5 through a maxmum of 2.5 of rating after being dyed with a variety of dyestuffs. Likewise, these yielded bulky continuous filaments proved to be lower in the wear-resisting property than that of the conventional PET filaments. And yet, these yielded bulky continuous filaments were apt to turn into fibrils. In consequence, inventors concluded that these adverse physical characteristics of the yielded continuous filaments were inappropriate for the composition of carpets.

The 6th Embodiment

Using the regenerated polyethylene terephthalate pellets identical to those which were made available for the fifth embodiment except for the modified amount of diphenyl carbonate added thereto, inventors dissolved and extruded the regenetated PET material. Inventors then analyzed the limiting value of viscosity, contents of carboxylic terminal radical and carbonic ester, and the physical and performance characteristics of continuous filaments yielded. The result is shown in Table 3.

The 7th Embodiment

Using the regenerated polyester resin identical to the one made available for the fifth embodiment, inventors added ethylene carbonate, propylene carbonate, and diphenyl carbonate to the regenerated polyester resinous material by replacing diphenyl carbonate, and then dissolved the blend before eventually yielding continuous filaments by executing those processes described earlier. Inconsequence, inventors successfully yielded quality bulky continuous filaments featuring quite satisfactory physical and performance characteristics.

The 8th Embodiment

Initially, inventors added diphenyl carbonate to the regenerated polyester resinous material mainly composed of collected pellets identical to the one made available for the fifth embodiment, and then added 0.05% by weight of hindered phenolic antioxidant like "Tetraquis" (methylene-3(3',5-di-t-butyl-4'-hydroxyphenyl) propyonate methane) and 0.07% by weight of ultraviolet absorber like 0,0'-dioxybenzophenon. Next, applying the condition identical to that is made available for the first embodiment, inventors dried the blended raw material, and then executed dissolving and extruding processes for spinning continuous filaments before eventually yielding bulky continuous filaments containing 3600 denier per 280 filament unit.

The yielded continuous filaments contained 24 micro-equivalent/gram of carboxylic terminal radical and 0.62 of the limiting value of viscosity. Compared to those continuous filaments devoid of antioxidant and ultraviolet absorber, after being dyed with a variety of dyestuffs, those bulky continuous filaments yielded by executing the 8th embodiment of the invention proved to be quite satisfactory in the lightfastness and the thermal ageing characteristic.

The 9th Embodiment

Initially, inventors prepared those polyester filaments including the following; 48 pieces of "super-bright" polyester filaments each having triangular section and 0.5 of the limiting value of viscosity measured by applying blend solution of tetrachloroethylene and phenol; 96 pieces of "semi-dull" polyester filaments each having triangular section and 0.58 of the limiting value of viscosity; and 48 pieces of "semi-dull" polyester filaments each having circular section and 0.63 of the limiting value of viscosity, where these polyester filaments are provided with a specific denier number of monofilament identical to each other. After spinning and aligning these polyester filaments, inventors lubricated them and then immediately executed an elongation process against the lubricated filaments. Next, inventors delivered the elongated filaments to the internal chamber of a stuffing box by absorbing them with steam containing 200° C. of heat and 4.5 kg.G/cm$^2$ of pressure before properly curling the steamed filaments. Inventors then wound those curled filaments via an interlacing process. The yielded polyester filaments were provided with 1986 denier of thickness and 5.5% of lengthwise difference.

Inventors then processed the yielded polyester filaments into a tufted carpet after converting them into tufted yarns by applying a conventional method. Those polyester filaments made into a loop carpet containing 4.2 mm of tuft-line intervals and 4.5 mm of pitch were totally free from streaky defect symptom otherwise caused by luster and abnormal curling effect.

The 3rd Comparative Embodiment

Inventors varied all the limiting values of viscosity of those three kinds of bulky continuous filaments yielded by executing those processes provided for the 9th embodiment of the invention, and then, applying those processing conditions identical to those which are made available for the 9th embodiment of the invention, inventors sequentially tufted, elongated, curled, and interlaced those bulky continuous polyester filaments. Inventors measured that the yielded 1994-denier bulky continuous polyester filaments had 0.4% of lengthwise difference between component monofilaments.

As was done for the 9th embodiment, inventors eventually processed those yielded continuous polyester filaments into a tufted carpet. Nevertheless, 23 units per sqaure meter of streaky defect containing excessive luster were narrowly found.

The 10th Embodiment

Initially, inventors prepared regenerated polyeser resin comprising blend of substantially equivalent amounts of film selvedge debris and pieces of scrapped bottles without adding pigment by replacing "superbright" polyester filaments containing 0.55 of the limiting value of viscosity. Inventors also prepared equivalent blend of regenerated and regular polyester resins by replacing "semi-dull" polyester filaments containing 0.58 of the limiting value of viscosity made available for the 9th embodiment. After spinning dissolved polyester resin into continuous filaments, both of those two kinds of polyester continuous filaments contained 0.55 and 0.58 of the limiting value of the viscosity.

After processing the yielded continuous filaments into a tufted carpet, inventors evaluated the final product to be quite satisfactory in the light of substantially indiscernible defective symptom like the one yielded from the 9th embodiment.

The 11th Embodiment

Based on the combination of a variety of polyester filaments and by varying lengthwise difference between these polyester filaments, inventors analyzed the generation of streaky defect in the produced tufted carpet. The result is shown in Table 4.

The 12th Embodiment

Initially, inventors spun three kinds of polyester filaments including the following: 48 pieces of triangular sectional polyester filaments containing 1.2% maroon pigment, 65% of regenerated polyester resin rated by applying blend solution of tetrachloroethane and phenol, 72% of carboxylic terminal radical against all the terminal radicals, and 0.55 of the limiting value of viscosity; 96 pieces of triangular sectional polyester filaments containing 0.4% of maroon pigment, 52% of regenerated polyethylene terephthalate resin, 57% of carboxylic terminal radical against all the terminal radicals, and 0.58 of the limiting value of viscosity; and 48 pieces of circular-sectional semi-dull polyester filaments totally free of regenerated polyethylene terephthalate resin, 22% of carboxylic terminal radical against all the terminal radicals, and 0.63 of the limiting value of viscosity, respectively. Note that all the above-cited polyester filaments contain equivalent denier number of component monofilament. Next, inventors properly aligned those three kinds polyester filaments, lubricated them, and then, elongated them immediately after completing the lubrication process. Next, applying steam containing 4.5 kg.G/cm$^2$ of pressure and 200° C. of heat, inventors delivered those elongated polyester filaments to the internal chamber of a stuffing box to execute a curling process. Next, inventors interlaced them before eventually winding the interlaced polyester filaments. The final polyester filaments respectively had 1986 denier of thickess.

Inventors then processed the yielded tufting polyester filaments into a tufted carpet by applying a conventional method. The loop carpet provided with 4.2 mm of tuft-line intervals and 4.5 mm of pitch was free of streaky defect otherwise caused by luster and abnormal curling effect.

The 4th Comparative Embodiment

Inventors produced those polyester filaments containing 0.63 of the limiting value of viscosity and 22% of carboxylic terminal radical against all the terminal radicals by replacing those conditions made available for implementing the 12th embodiment of the invention. Inventors exercised those remaining identical conditions made available for the 12th embodiment to execute spinning, elongating, curling, and interlacing processes. Next, in the same way as was done for the 12th embodiment, inventors processed those interlaced polyester filaments into a tufted carpet. In consequence, inventors detected that a total of 28 units per square meter of streaky defect exhibiting substantial luster were present on the produced tufted carpet.

The 13th Embodiment

Inventors prepared blend of 50% regenerated polyethylene terephthalate resin devoid of pigment content by replacing the circular-sectional semi-dull polyester filaments containing 0.63 of the limiting value of viscosity made available for the 12th embodiment of the invention. After spinning the blend of resin into continuous filaments, inventors measured that those modified continuous polyester filaments contained 55% of carboxylic terminal radical against all the terminal radicals and 0.56 of the limiting value of viscosity. After processing those modified continuous polyester filaments into a tufted carpet, like the 12th embodiment, inventors merely detected minimal streaky defect symptom.

The 14th Embodiment

By combining a variety of polyester filaments and varying the content of carboxylic terminal radical, inventors checked the occurrence of streaky defect symptom on the produced tufted carpet. The result is shown in Table 5.

The 15th Embodiment

Initially, inventors spun three kinds of polyester filaments including the following; 48 pieces of triangular-sectional polyester filaments containing 1.2% by weight of maroon pigment, 0.61 of the limiting value of viscosity rated by applying blend solution comprising tetrachloroethane and phenol, and 31.64% of flexible chain; 96 pieces of triangular-sectional polyester filaments containing 0.4% by weight of maroon pigment, 31.78% of flexible chain, and 0.58 of the limiting value of viscosity; and 48 pieces of circular-sectional semi-dull polyester filaments copolymerized with diethylene glycol containing 33.40% of flexible chain and 0.63 of the limiting value of viscosity, respectively. Note that these three kinds of polyester filaments are respectively composed of monofilaments having identical denier number.

Next, inventors properly aligned these polyester filaments, lubricated them, and then, elongated those polyester filaments immediately after execution of the lubrication. Next, applying steam containing 4.5 kg G/cm² of pressure and 200° C. of heat, inventors delivered those elongated polyester filaments to the internal chamber of a stuffing box to execute a curling process. Finally, inventors interlaced those curled polyeser filaments and wound them. The curled polyester filaments respectively had 1976 denier of thickness.

Using those curled spun filaments, inventors then processed them into a tufted carpet by applying a conventinal process. The loop carpet containing 4.2 mm of tufted-line intervals and 4.5 mm of pitch was totally free from streaky defect symptom otherwise caused by luster and abnormal curling.

The 5th Comparative Embodiment

Inventors produced those polyester filaments containing 31.7+/−0.03% of flexible chains by replacing those conditions made available for executing the 15th embodiment of the invention. Inventors exercised all the remaining identical conditions made available for the 15th embodiment in order to sequentially execute spinning, elongating, curling, and interlacing processes. Then, in the same way as was done for the 15th embodiment, inventors processed those 2009-denier polyester filaments into a tufted carpet. In consequence, inventors detected that a total of 29 units per square meter of streaky defect symptom exhibiting substantial luster were present in the produced tufted carpet.

The 16th Embodiment

Inventors prepared polyester resin copolymerized with adpic acid by replacing the circular-sectional semi-dull polyester filaments (copolymerized with diethylene glycol) containing 0.63 of the limiting value of viscosity. Inventors analyzed that the component polyester resin prepared for the 16th embodiment contained 34.55% of flexible chain and 0.61 of the limiting value of viscosity. After processing those yielded polyester filaments into a tufted carpet, like the 15th embodiment, inventors merely detected minimal streaky defect symptom.

The 17th Embodiment

By combining a variety of polyester filaments and varying the difference of the content of flexible chain between respective components, inventors checked the generation of streaky defect symptom on the produced tufted carpet. The result is shown in Table 6.

TABLE 1

Drying condition and resinous characteristic after completing an extrusion process

| NO. | ① | ② | ③ | ④ | ⑤ | ⑥ |
|---|---|---|---|---|---|---|
| 1 | 135 | 45 | 0.54 | 0.56 | 25 | X |
| 2 | 135 | 240 | 0.55 | 0.59 | 33 | Δ~○ |
| 3 | 135 | 450 | 0.55 | 0.61 | 37 | ○ |
| 4 | 135 | 750 | 0.54 | 0.65 | 73 | ⊚ |
| 5 | 185 | 25 | 0.54 | 0.55 | 29 | Δ |
| 6 | 185 | 180 | 0.55 | 0.61 | 63 | ⊚ |
| 7 | 185 | 420 | 0.55 | 0.63 | 78 | ⊚ |
| 8 | 185 | 510 | 0.54 | 0.65 | 88 | X~Δ |

①Drying temperature (°C.)
②Drying time (Minutes)
③IV (limiting value of viscosity) before the extrusion process
④IV (limiting value of viscosity) after the extrusion process
⑤Content of carboxylic terminal radical (% vs all terminal radicals)
⑥Static chargeability after 3 months of elapse

TABLE 2

Drying condition (flow-rate) and PET resin characteristic after completing an extrusion process

| NO. | ① | ② | ③ | ④ | ⑤ |
|---|---|---|---|---|---|
| 11 | 28 | 0.6 | 0.50 | 25 | X |
| 12 | 35 | 0.7 | 0.53 | 38 | ○ |
| 13 | 46 | 0.9 | 0.54 | 42 | ○ |
| 14 | 103 | 2.0 | 0.56 | 38 | ○ |
| 15 | 147 | 3.0 | 0.59 | 52 | ○ |
| 16 | 281 | 6.0 | 0.61 | 79 | Δ~○ |
| 17 | 410 | 8.1 | 0.60 | 86 | X |

①Flow rate of hot air (kg/hour)
②Magnification against the dried amount (times)
③IV (limiting value of viscosity) after the extrusion process
④Content of carboxylic terminal radical (% vs all terminal radicals)
⑤Static chargeability after 3 months of elapse

TABLE 3

Amount of added diphenyl carbonate (DPC) and physical/performance characteristic of continuous filaments and polymer

| NO | ① | ② | ③ | ④ | ⑤ | ⑥ |
|---|---|---|---|---|---|---|
| 1 | 0.25 | 0.57 | 38 | 0.08 | X | Insufficient strength |
| 2 | 0.85 | 0.61 | 25 | 0.31 | ○ | |
| 3 | 1.80 | 0.63 | 29 | 0.57 | ○ | |
| 4 | 3.50 | 0.65 | 30 | 0.86 | ⊚ | |
| 5 | 4.52 | 0.59 | 38 | 1.21 | ⊚ | |
| 6 | 9.5 | 0.61 | 50 | 2.33 | ⊚ | |
| 7 | 11.3 | 0.57 | 49 | 3.01 | ⊚ | |
| 8 | 25.6 | 0.64 | 53 | 7.25 | ⊚ | Curling property Δ |
| 9 | 64.5 | 0.59 | 57 | 17.31 | ⊚ | Curling property X |

①Amount of added DPD (%)
②IV (limiting value of viscosity) after the extrusion process
③Content of carboxylic terminal radical (μequ/g)
④Content of carbonic ester (mol %)
⑤Ligntfastness rating of dyed filaments
⑥Other physical properties of dyed filaments

TABLE 4

Relationship between difference of filament length and streaky defect generated in the carpet

| NO. | Component A [η] | Component A Melting point (°C.) | Component B [η] | Component B Melting point (°C.) | Component C [η] | Component C Melting point (°C.) | Difference of filament length (%) | Streaky defect per m² |
|---|---|---|---|---|---|---|---|---|
| 1 | 0.59 | 266 | 0.63 | 266 | 0.63 | 265 | 1.2 | 5 |
| 2 | 0.62 | 257 | 0.63 | 267 | 0.61 | 266 | 2.7 | 1 |
| 3 | 0.51 | 267 | 0.54 | 265 | 0.59 | 265 | 3.1 | 1 |
| 4 | 0.50 | 264 | 0.55 | 266 | 0.60 | 255 | 5.5 | 0 |
| 5 | 0.45 | 267 | 0.58 | 265 | 0.63 | 252 | 8.8 | 0 |
| 6 | 0.51 | 262 | 0.55 | 255 | 0.56 | 243 | 15.3 | 2 |
| 7 | 0.51 | 263 | 0.56 | 256 | 0.54 | 237 | 23.9 | 6 |
| 8 | 0.51 | 262 | 0.55 | 255 | 0.67 | 231 | 27.3 | 12 |

TABLE 5

Relationship between the difference of the content (Ct) of carboxylic terminal radical and streaky defect of the carpet

| NO. | Component A [η] | Component A Ct (%) | Component B [η] | Component B Ct (%) | Component C [η] | Component C Ct (%) | Difference of content (%) | Streaky defect per m² |
|---|---|---|---|---|---|---|---|---|
| 1 | 0.59 | 36.6 | 0.61 | 36.0 | 0.60 | 36.1 | 0.6 | 9 |
| 2 | 0.62 | 35.7 | 0.63 | 32.6 | 0.61 | 32.9 | 3.1 | 4 |
| 3 | 0.51 | 42.3 | 0.54 | 40.5 | 0.59 | 38.9 | 3.4 | 2 |
| 4 | 0.50 | 48.4 | 0.55 | 39.6 | 0.60 | 38.5 | 9.9 | 0 |
| 5 | 0.45 | 50.8 | 0.58 | 38.1 | 0.63 | 37.3 | 13.5 | 0 |
| 6 | 0.51 | 53.9 | 0.55 | 39.2 | 0.56 | 26.8 | 17.1 | 2 |
| 7 | 0.51 | 59.4 | 0.56 | 41.3 | 0.54 | 33.7 | 25.7 | 5 |
| 8 | 0.51 | 60.8 | 0.55 | 55.3 | 0.67 | 22.1 | 38.76 | 12 |

TABLE 6

Relationship between the difference of the content of flaxible chanin and streaky defect on the carpet

| NO. | Component A [η] | Component A Cf (%) | Component B [η] | Component B Cf (%) | Component C [η] | Component C Cf (%) | Difference of the content of flexible chain (%) | Streaky defect per m² |
|---|---|---|---|---|---|---|---|---|
| 1 | 0.59 | 31.66 | 0.61 | 31.70 | 0.60 | 31.76 | 0.10 | 9 |
| 2 | 0.62 | 31.72 | 0.63 | 31.69 | 0.61 | 31.93 | 0.21 | 4 |
| 3 | 0.51 | 31.63 | 0.54 | 31.75 | 0.59 | 31.98 | 0.35 | 2 |
| 4 | 0.50 | 31.74 | 0.55 | 31.76 | 0.60 | 32.51 | 0.77 | 0 |
| 5 | 0.45 | 31.68 | 0.58 | 31.91 | 0.63 | 33.39 | 1.71 | 0 |
| 6 | 0.51 | 31.92 | 0.55 | 31.72 | 0.56 | 34.28 | 2.56 | 2 |
| 7 | 0.51 | 31.84 | 0.56 | 31.73 | 0.54 | 35.07 | 3.34 | 5 |
| 8 | 0.51 | 31.82 | 0.55 | 31.83 | 0.67 | 36.09 | 4.27 | 18 |

What is claimed is:

1. Continuous polyester filaments comprising a polyester resin solely available for composing carpets, components of said continuous filaments mainly comprise polyethylene terephthalate resin; said continuous filaments are complete with a crimped effect generated by means of a stuffing box; said crimped effect is yielded by crimping comprising 3 through 15 units per 25 mm of density; and said continuous polyester filaments are individually provided bulkiness.

2. Continuous polyester filaments comprising polyester resin as set forth in claim 1, wherein at least 20% by weight of polyethylene terephthalate resin is regenerated resin.

3. Continuous polyester filaments solely available for composing carpets as set forth in claim 1, wherein a ratio of carboxylic radical to those terminal radicals present in said polyethylene terephthalate resin has a range from 30% to a maximum 80%.

4. Continuous polyester filaments solely available for composing carpets as set forth in claim 1, in which said polyethylene terephthalate resin contains from about 0.2 through a maximum of 15 mol % of dibasic acid which is substantially shared by carbonic ester.

5. Continuous polyester filaments solely available for composing carpets as set forth in claim 4, wherein said polyethylene terephthalate resin remelted by addition of carbonic ester thereto, and wherein a limiting value of intrinsic viscosity of said polyethylene terephthalate resin after execution of said remelting process is greater by about 0.01 through 0.25 than that is rated before execution of a drying process.

6. Continuous polyester filaments composing carpets as set forth in claim 5, wherein said polyethylene terephthalate resin is dried in an atmosphere containing below −20° C. of dewpoint temperature, and wherein the limiting value of intrinsic viscosity of said polyethylene terephthalate resin after completing said remelting process is greater by 0.01 through a maximum of 0.15 than that is rated before execution of said drying process.

7. Continuous polyester filaments solely available for composing carpets as set forth in claim 1, wherein said more than two kinds of continuous filaments substantially comprise such continuous polyester filaments respectively containing 1 through a maximum of 25% of a difference of filaments length in tufted domains.

8. Continuous polyester filaments solely available for composing carpets as set forth in claim 1, wherein said more than two kinds continuous filaments contain a limiting value of intrinsic viscosity being different from each other by more than 0.02.

9. Continuous polyester filaments solely available for composing carpets as set forth in claim 1, wherein said more than two kinds of continuous filaments have a melting point which is different from each other by more than 2° C.

10. Continuous polyester filaments solely available for composing carpets as set forth in claim 1, wherein said more than two kinds of continuous filaments substantially comprise such polyester filaments containing a blend ratio of regenerated resin being different from each other.

11. Continuous polyester filaments solely available for composing carpets as set forth in claim 1, wherein said more than two kinds of continuous filaments comprise those continuous filaments which are dyed in more than two different shades.

12. Continuous polyester filaments solely available for composing carpets as set forth in claim 11, wherein said continuous filaments dyed in more than two different shades are combined with each other by varying concentration of an identical pigment.

13. Continuous polyester filaments solely available for composing carpets as set forth in claim 11, wherein said more than two kinds of continuous filaments are substantially continuous polyester filaments composed of those filaments which are dyed in different shades, wherein the content of carboxylic terminal radical of respective continuous polyester filaments shall be in a range from 30% to a maximum of 85% relative to all the terminal radicals, and wherein there is 0.5% through a minimum of 25% of the difference between maximum and minimum contents of carboxylic terminal radical relative to all terminal radicals.

14. Continuous polyester filaments solely available for composing carpets as set forth in claim 1, wherein the content of a flexible chain of polyester resin of more than two kinds of continuous filaments differs in a range from 0.1% through 4.0% between the maximum and minimum values of said content.

15. Continuous polyester filaments solely available for composing carpets as set forth in claim 14, wherein said flexible chain is derived from at least one compound selected from the following group diethylene glycol, polyethylene glycol, fatty dicarbonic acid, or fatty oxycarbonic acid.

16. Continuous polyester filaments solely available for composing carpets as set forth in claim 14, wherein among polyester components of said more than two kinds of continuous filaments, the polyester component containing maximum content of said flexible chain contains a limiting value of intrinsic viscosity which is greater by 0.01 to 0.02 than that of the other polyester component containing a minimum content of said flexible chain.

17. Continuous polyester filaments solely available for composing carpets as set forth in claim 1, wherein said polyethylene terephthalate resin contains from about 0.01 through a maximum of 2.0% of one or more than one kind of additive selected from groups of antioxidant and ultraviolet absorber.

18. A method of manufacturing continuous polyester filaments solely available for composing carpets which comprises, executing an elongation process in succession to melting and a spinning process; blending elongated filaments with such filaments capable of generating about 8 through 20% of a difference in shrinkage generated by use of boiled water during said elongation process; forcibly transferring said blend filaments to a stuffing box, and providing said blended filaments with a crimped effect by means of a hot-air flow.

19. A method of manufacturing continuous polyester filaments solely available for composing carpets which comprises, blending polyester resinous material containing a built-in pigment with such polyester resinous materials incorporating a specific amount of carboxylic radical differing from each other and every shade; producing melted polyester resinous material dyed in different shades; spinning said melted polyester resinous material into filaments; elongating said spun-out filaments in succession to said spinning process; converting said elongated filaments into continuous polyester filaments so that 0.5% through a maximum of 25% of difference can be generated between the maximum and minimum contents of carboxylic terminal radicals against all the terminal radicals present in polyester components of yielded continuous filaments; delivering said continuous polyester filaments to a crimping chamber of a stuffing box, and finally providing said continuous polyester filaments with a crimped effect by applying a flow of heater air.

* * * * *